United States Patent [19]
Kugler

[11] Patent Number: 4,936,346
[45] Date of Patent: Jun. 26, 1990

[54] DETENT MECHANISM FOR A CONTROL VALVE

[75] Inventor: Uwe H. Kugler, Cedar Falls, Iowa

[73] Assignee: Deere & Company, Moline, Ill.

[21] Appl. No.: 455,211

[22] Filed: Dec. 21, 1989

Related U.S. Application Data

[62] Division of Ser. No. 342,845, Apr. 24, 1989, Pat. No. 4,913,190.

[51] Int. Cl.⁵ .............................................. F15B 13/04
[52] U.S. Cl. .................................. 137/624.27; 251/297
[58] Field of Search ................... 137/624.27; 251/297

[56] References Cited

U.S. PATENT DOCUMENTS 3,128,677  4/1964  Tennis ..................... 137/624.27 X Primary Examiner—Gerald A. Michalsky

[57] ABSTRACT

A control valve includes a main valve spool movable to a plurality of positions. A detent mechanism with a plurality of operational modes operates to releasably hold the main valve spool in displaced positions. An operator-controlled selector mechanism is coupled to the detent mechanism and is operable to selectively place the detent mechanism in a selected one of its operational modes.

9 Claims, 4 Drawing Sheets

DETENT MECHANISM FOR A CONTROL VALVE

This application is a division of application Ser. No. 07/342,845, filed 24 April 1989, now U.S. Pat. No. 4,913,100.

Background of the Invention

The present invention relates to a detent mechanism for releasably holding a spool valve member in selected positions.

Control valves for controlling remote hydraulic functions are well known. In some applications, such as for controlling a hydraulic cylinder on a front-end loader, a control valve with no-detent function is used. Other applications, such as controlling fluid flow to a hydraulic motor, require a control valve which is detent-held in certain positions. Yet another application, such as controlling fluid flow to certain hydraulic cylinders, requires a valve with a detent function wherein the detent is automatically "kicked out" when the cylinder reaches the limit of its travel. Heretofore, these different applications have required different control valves. It would be desirable to have a single valve capable of being selectively placed in various detent functional modes.

Summary of the Invention

An object of the present invention is to provide a control valve with a detent function which can be selectively modified by an operator adjustment.

Another object of the present invention is to provide a control valve with an operator-adjustable detent mechanism which can be adjusted without the use of special tools.

A further object of the present invention is to provide a control valve with a detent mechanism which can be selectively placed in a no-detent mode and a continuous-detent mode.

A further object is to provide such a control which can be selectively placed in a detent kick-out mode.

These and other objects are achieved by one embodiment of the present invention wherein one end of a control valve spool carries outwardly biased detent balls and is received in a hollow sleeve which may be rotated by an operator to a detent position wherein a set of spaced-apart grooves are positioned to releasably receive the detent balls. The sleeve may also be rotated to a no-detent position wherein grooves which connect extend and retract detent recesses receive the detent balls so that the valve spool may be freely moved without hindrance from the detent balls. In another embodiment, the control valve spool receives a pressure-operated detent piston which has a groove for receiving the detent balls and a frustoconical surface which can engage the detent balls and urge them outwardly for receipt by spaced-apart detent grooves in the sleeve. An operator-controlled detent control valve is adjustable to control the pressure which acts on the detent piston, thereby providing pressure-operated, operator-selectable detent and non-detent modes. In a third embodiment, the detent control valve includes spring-biased poppet valves and a load pressure-responsive detent release piston. The spring bias is operator-adjustable to provide a continuous detent mode, a load pressure-responsive detent kick-out mode, and a no-detent mode.

Description of the Preferred Embodiment

Figure 1:
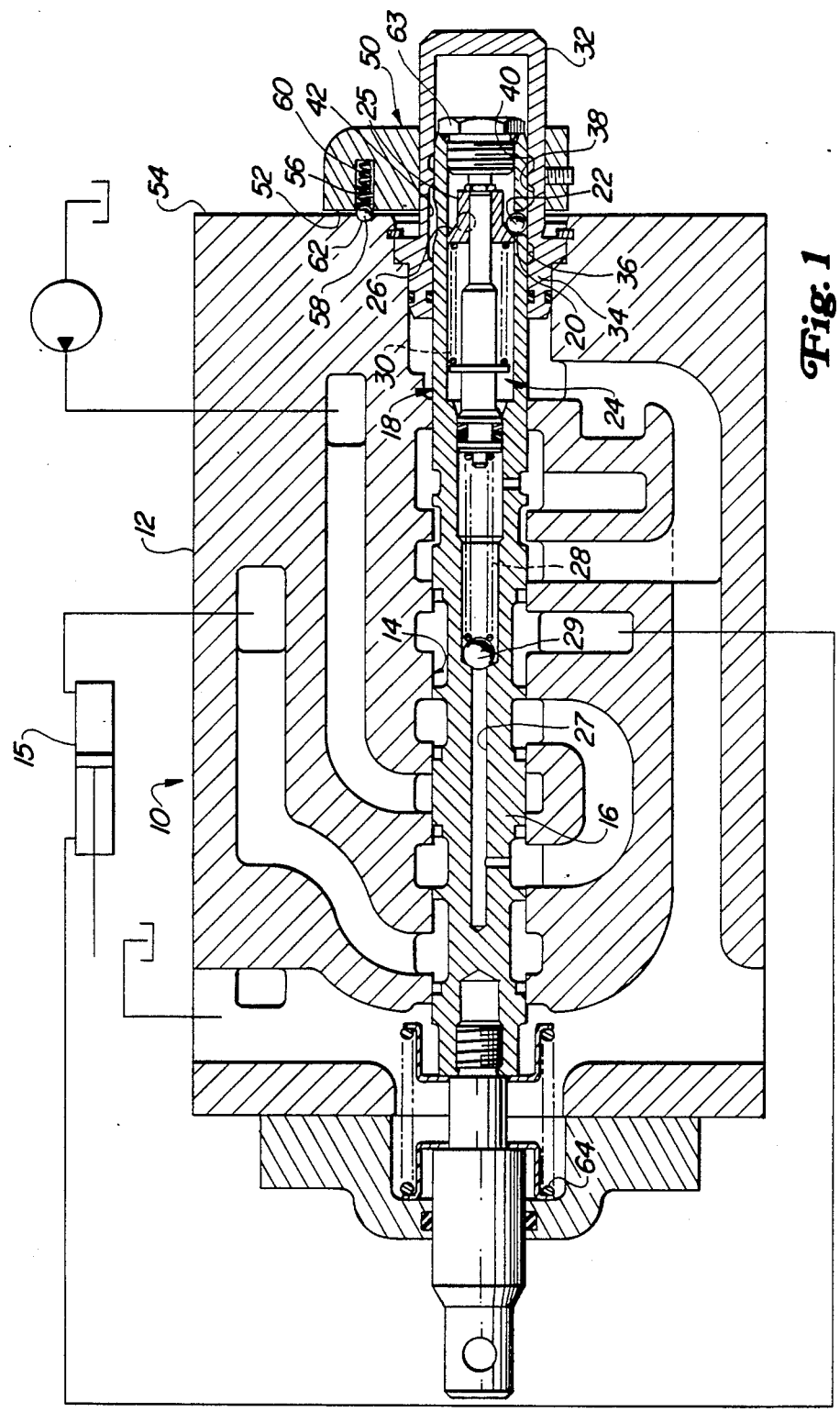
FIG. 1 is a cross-sectional view of a control valve with an operator-selectable detent mechanism constructed according to the present invention.

Referring to FIG. 1, a spool-type hydraulic control valve 10 includes a valve housing 12 with a valve bore 14 extending therein. A valve member 16 is slidably received in the bore 14 and cooperates with various grooves and lands to control fluid flow to a load 15 such as a cylinder or a motor. A hollow end 18 of the valve member has at least one (preferably three) radially extending detent apertures 20, each of which receives a detent ball 22. A cylindrical member 24 is slidably received in the hollow end 18. A hollow cylindrical member 25 is slidably mounted on member 24 and includes a frustoconical surface 26 which engages the detent ball 22. Springs 28 and 30 are biased to urge member 25 to the right, viewing FIG. 1, so that the surface 26 urges the detent ball 22 outwardly. Also, load pressure via passage 27 and check valve 29 acts upon member 24 to urge it to the right, viewing FIG. 1.

The springs 28 and 30 are not strong enough by themselves (without load pressure) to maintain the detent balls 22 in their detent position. Thus, when pump (and load) pressure is lost, the members 24 and 25 will move to the left and allow the detent balls 22 to retract, thus allowing the main valve member 16 to freely return to its neutral position under the influence of centering spring 64. This gives the control valve 10 a "neutral start" capability. Plug 63 limits the travel of member 24 so that the spring 30 does not go solid. This allows the operator to manually pull valve member 16 out of one of its detented positions. The check ball 29 is located between pressure passage 27 and member 24 to prevent premature disengagement from a detented position due to a momentary pressure drop in passage 27.

A hollow cylindrical detent cap 32 includes a base 34 sealingly and rotatably received in the axially outer portion of the bore 14 and extends axially outwardly from the housing 12. The cap 32 slidably and sealingly receives the hollow end 18 of the valve member. One portion of the inner surface of cap 32 includes a plurality of spaced-apart detent recesses 36, 38 and 40 for receiving the detent ball 22 and thereby releasably holding the valve member 16 in a corresponding plurality of positions. The inner surface of cap 32 also includes three continuous axially extending recesses 42 which have a length which is substantially equal to the distance between opposite sides of recesses 36 and 38, each of which is capable of receiving a corresponding one of the detent balls 22.

A selector knob 50 is fixed to the cap 32 so that manual rotation of knob 50 causes rotation of cap 32 about its central axis. In this manner, the knob 50 is rotated to rotate cap 32 from the first position shown wherein detent recesses 36, 38 and 40 will releasably hold the valve member in a plurality of spaced-apart axial positions to a second position wherein recess 42 will receive ball 22 so that the valve member 16 will be freely movable axially over a distance equal to slightly less than the axial length of groove 42.

The knob 50 includes one side 52 which faces and is adjacent to an end 54 of the valve housing 12. A blind bore 56 extends part way into side 52 and receives a detent ball 58 and a detent spring 60. The housing end 54 includes a recess 62 which receives ball 58 to releasably hold knob 50 in the position shown and a second recess (not shown) which receives the ball 58 to releasably hold the knob 50 in a (no detent) position wherein the balls 22 will be received by the long recess 42.

Figure 2:
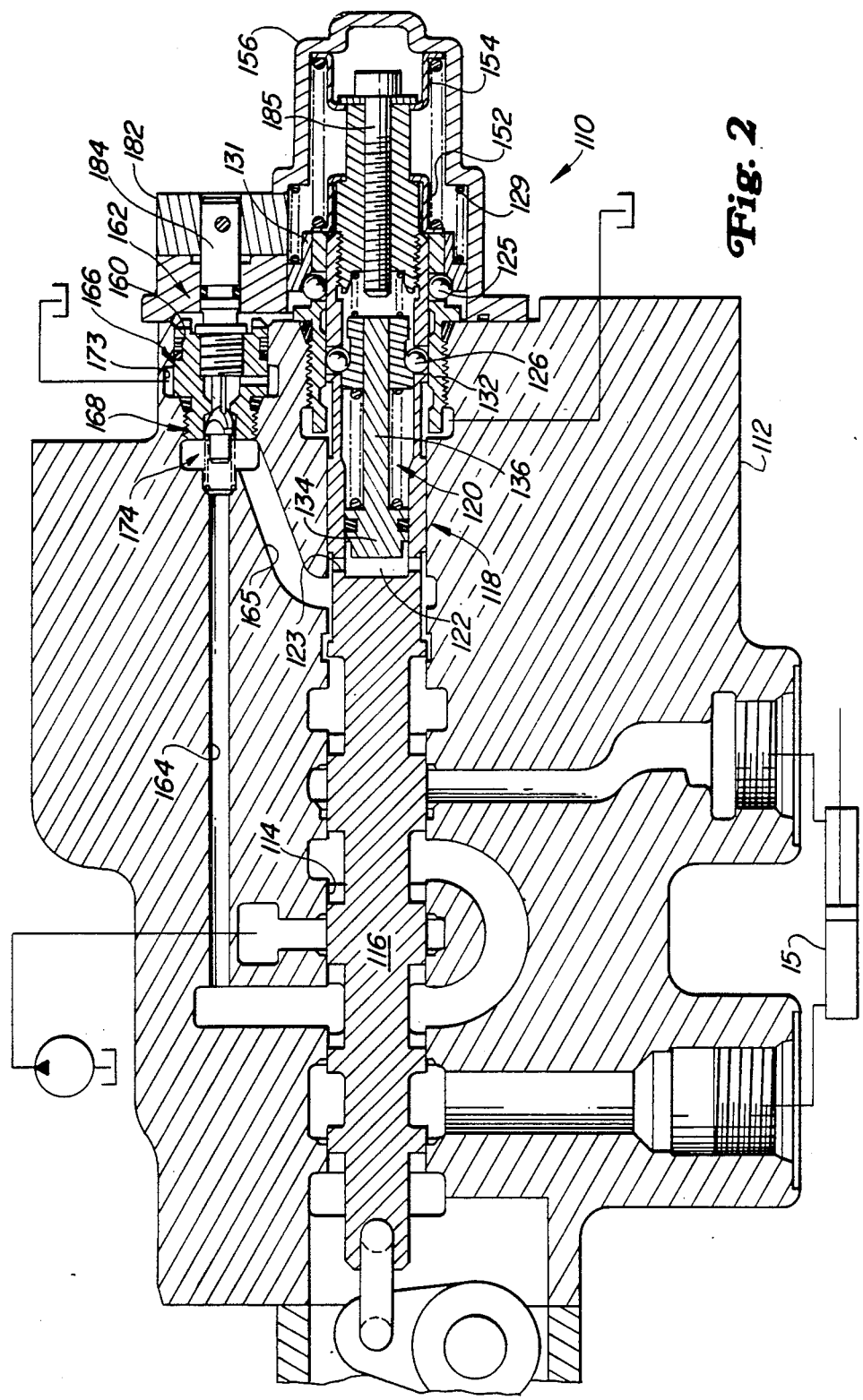
FIG. 2 is a cross-sectional view of an alternate embodiment of the present invention.
Figure 3:
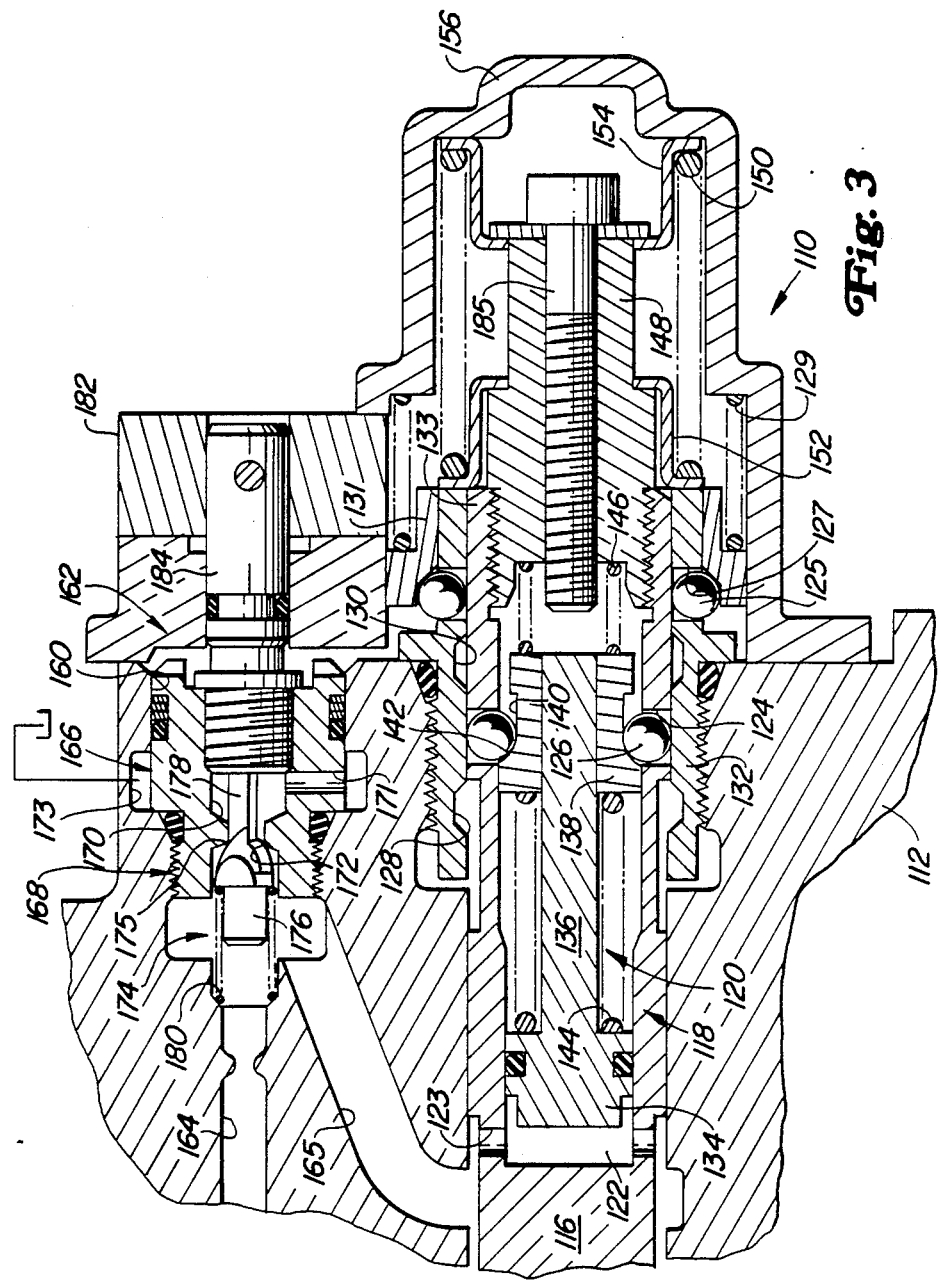
FIG. 3 is an enlarged view of a portion of FIG. 2.

An alternate embodiment is shown in FIGS. 2 and 3 wherein the control valve 110 includes a valve housing 112 with a main valve bore 114 extending therein for slidably receiving main spool valve member 116. A hollow end 118 of spool 116 receives a detent piston 120 and cooperates therewith to form a detent control chamber 122. A plurality of radial openings 124 receive detent balls 126 which are received by detent recesses 128 and 130 in detent sleeve 132. Another set of detent balls 125 are received in apertures 127 in sleeve 132 and are biased by spring 129 and spring slider 131 for engaging shoulder 133 to releasably hold the main spool 116 in a float position. Chamber 122 is communicated with bore 114 via radial ports 123.

The detent piston 120 includes a piston member 134 from which extends a shaft 136 on which is slidably mounted a head 138. The head 138 has an annular peripheral groove 140 therein, one end of which defines a frustoconical surface 142. A spring 144 is coupled between piston member 134 and head 138 and spring 146 is coupled between head 138 and cap member 148 which is threadably coupled to the hollow end 118. Cap member 148 is coupled to valve centering spring 150 via spring guides 152 and 154, all contained within a closure cap 156.

A second valve bore 160 extends into the valve housing 112 and receives a detent valve assembly 162. The inner end of bore 160 is communicated to load pressure via passage 164 and to control chamber 122 via passage 165 and ports 123. The detent valve assembly includes a detent valve sleeve 166 which is sealingly received in an enlarged portion of bore 160 and is held in place by a threaded connection at 168. A poppet valve bore 170 extends axially through sleeve 166 and includes a reduced diameter portion forming a poppet valve seat 172. Radial port 171 communicates bore 170 with a groove 173 which is connected to sump via a passage which is not shown. A poppet valve member 174 is received within bore 170 and includes a conical seat portion 175 for sealingly engaging seat 172, a base 176 and a stem 178. Spring 180 is biased to urge poppet valve member 178 into engagement with seat 172. A similar poppet valve member is described in U.S. Patent No. 4,303,098, issued 1 December 1981, which is incorporated by reference herein.

An operator-movable control knob 182 is connected to a shaft 84 which is threadably received by sleeve 166 and the end which engages the step 178 of poppet valve 174. In the position shown in FIG. 3, the shaft 184 is holding poppet valve member 174 slightly away from seat 172 so that detent control chamber 122 will be communicated with sump via port 123, passage 165, bore 70 and groove 173. With sump pressure in control chamber 122, the detent piston 120 is in position to allow the detent balls to retract radially into grooves 140 and the spool valve 116 can be moved without any detent function. If the control knob is turned counterclockwise, the shaft 184 will be withdrawn from bore 170 allowing poppet valve member 174 to engage seat 172 which blocks the communication between control chamber 122 and sump. Load pressure is communicated to chamber 122 via passages 164, 165 and ports 123, thus urging detent piston to the right, viewing FIG. 3. The frustoconical surface 142 urges the detent balls 126 radially outwardly so that when the spool 116 is moved left or right, the detent balls will enter recesses 128 or 130 to releasably hold the spool 116 in its displaced position. A screw 185 has an end which is engageable with detent piston 120 to prevent spring 144 from being completely compressed. This allows an operator to pull the main valve member 116 out of its detent-held positions. As in the previous embodiment, hydraulic pressure is required so that head 138 will bias the detent balls 126 outwardly and hold the main valve member 116 in a detent-held position. When pump pressure is lost, the pressure in chamber 122 drops to permit head 138 to move to the left, thus releasing the main valve member from a detent-held position and allowing it to automatically return to a neutral position.

Figure 4:
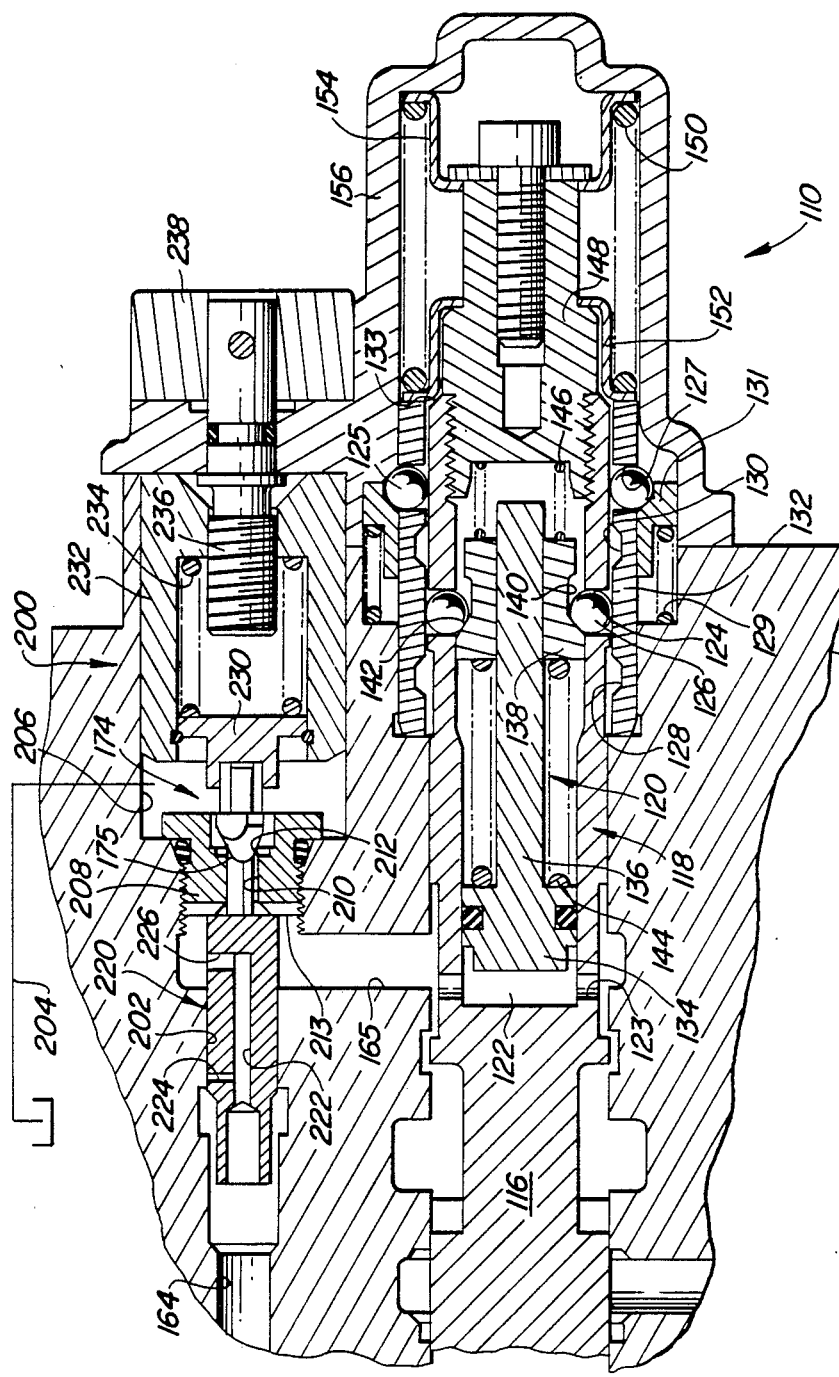
FIG. 4 is an enlarged view similar to FIG. 3, but of another embodiment of the present invention.

Another alternate embodiment is shown in FIG. 4. Portions of this embodiment are similar to parts of the embodiment of FIGS. 2 and 3 and common reference numerals are assigned to such parts. The FIG. 4 embodiment differs from the FIG. 2 and 3 embodiment with respect to the detent control valve 200. A valve bore 202 extends into housing 112 and communicates with passages 164 and 165. A passage symbolically indicated by line 204 communicates a large diameter portion 206 of bore 202 with sump pressure.

A poppet seat member 208 is threadably held in place in bore 202 between passages 165 and the large diameter portion 206. A central bore 210 extends through member 208 and forms poppet seat 212. A plurality of projections or ridges 213 extend axially and radially from the end of poppet seat member 208 which faces towards passage 164 and which is exposed to fluid pressure in passage 165. Poppet valve member 174 (identical to that shown in FIG. 3) is partially received in bore 210 and its seat 175 is sealingly engageable with poppet seat 212.

A kick-out spool 220 is slidably and sealingly mounted in bore 202 between passage 164 and poppet seat member 208. A blind central bore 222 extends into spool 220 and a pair of radial ports 224 and 226 communicate bore 222 to the exterior spool 220. The stem of poppet valve member 174 engages the end of kick-out spool 220. The base of poppet valve member engages a spring seat 230 which is received and retained within kick-out sleeve 232 and which is biased into engagement with poppet valve member 174 by spring 234. Kick-out sleeve 232 is threadably coupled to a shaft 236 which is coupled for rotation with manually rotatable control knob 238. The kick-out sleeve 232 is non-rotatably mounted in the large diameter bore portion 206. This can be accomplished by giving periphery of kick-out sleeve 232 and the bore portion 206 a hexagonal or polygon-shape, thus forcing sleeve 232 to move axially within bore portion 206 as shaft 236 is rotated. Alternatively, key and slot arrangements could also be used.

The embodiment of FIG. 4 has three different functional modes—a no-detent mode, a continuous-detent mode and a detent kick-out mode.

The no-detent mode would be used when the control valve is connected to operate the hydraulic cylinder of a loader. The continuous-detent mode would be used if the control valve is connected to operate a bi-directional hydraulic motor (not shown). The detent kick-out mode would be used when the control valve is connected to operate the hydraulic cylinder of an agricultural implement (not shown).

The no-detent mode is illustrated in FIG. 4 because the poppet valve member 174 is spaced away from seat 212. This allows sump pressure to be communicated to detent control chamber 122 via bore 210, between ridges 213 and via passage 165 and ports 123. As was the case with the FIG. 2 embodiment, this allows detent balls to retract into groove 140 of detent piston 120, and the main spool 116 can then be moved without being detent held by detent balls 126.

The continuous detent mode is achieved by turning the control knob 238 clockwise which moves sleeve 232 and spring seat 230 to the left, viewing FIG. 4. This moves the poppet valve 174 into tight sealing engagement with poppet seat 212, thus blocking communication between detent control chamber 122 and sump. Load pressure from passage 164 is communicated via bore 222, port 226, passage 165 and ports 123 to detent control chamber 122 so that piston 120 will urge detent balls 126 radially outwardly for reception into detent recesses 128 and 130.

The detent kick-out mode is achieved by reducing the compression load in spring 234. The detent kick-out mode operates as follows. Assuming that the spool 116 is initially in a detent-held position such that the cylinder 15 is being extended, first, the control knob 238 is rotated counterclockwise from the continuous detent position to reduce the compression load of spring 234.

Then, when the load pressure 164 becomes high enough, such as when the cylinder 15 is fully extended, this load pressure will overcome the reduced force of spring 234 and move poppet valve member 174 to the right and the kick-out spool 220 will move to the right due to pressure drop since 174 opens to sump. Port 224 continues to move into bore 220 which shuts off pressure oil to 122. Since the poppet valve 174 continues to bleed pressure oil to sump, the detent piston 120 moves to the left and detent balls 126 will release.

As in the previous embodiments, hydraulic pressure is required to engage the detent balls into grooves 128 and 130, and when pump pressure is shut off, the detent mechanism disengages so that the spool 116 automatically returns to its neutral position. In certain applications, it is desirable not to have the detent kick-out or neutral start functions operate from the float position of the main valve member 116. The embodiment of FIGS. 2 and 3 shows this type of float detent wherein detent balls 125 are spring-biased by spring 129.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A detent mechanism for a valve controlling fluid communication between a sump, a pressure source and a hydraulic function, the valve having a housing defining a valve bore therein and a main valve member movable in the bore to control fluid flow, characterized by:
   the main valve member including a detent portion having an aperture extending radially therein;
   a detent ball received in the aperture;
   a spring-biased member engaging the detent ball and urging it radially out of the aperture;
   a detent means for moving to a first detent position and releasably holding the main valve member in a plurality of spaced apart positions, and for moving to a second position and permitting the main valve member to freely move between said spaced apart positions; and
   an operator-controlled selector means coupled to the detent means for selectively maintaining the detent means in either of its first and second positions, the detent means being positioned adjacent to the detent portion of the main valve member, the detent means having a first surface portion engageable with the detent ball and having a plurality of axially spaced-apart detent recesses formed therein for receiving the detent ball when the main valve member is in said spaced-apart positions, and the detent means having a second surface portion engageable with the detent ball and having a continuous groove formed therein for receiving the detent ball as the main valve member moves between said spaced-apart positions, movement of the selector means causing the detent means to move to its first position wherein the first surface engages the detent ball and to its second position wherein the second surface engages the detent ball.

2. The detent mechanism of claim 1, wherein:
the detent portion of the main valve member is hollow and slidably receives the spring-biased member.

3. The detent mechanism of claim 2, wherein:
the spring-biased member comprises a frustoconical surface portion engaging the detent ball to urge the detent ball radially outwardly.

4. The valve of claim 1, wherein:
the detent means comprises a hollow cylindrical member which receives the detent portion of the main valve member.

5. The valve of claim 1, wherein:
the selector means comprises a detent device for releasably holding the detent means in its first and second positions.

6. The valve of claim 1, wherein:
the detent means projects outwardly from an end of the valve bore; and
the selector means comprises a manually operable selector member attached to the detent means for rotating the detent means to its first and second positions.

7. The valve of claim 6, wherein:
the selector member includes a detent bore for partially receiving a detent sphere and a spring member biased to urge the detent sphere out of the detent bore; and
the valve housing comprises a detent recess formed in an outer surface thereof for receiving the detent sphere and releasably holding the selector member in a selected position.

8. The detent mechanism of claim 1 wherein:
the detent means is rotatable between its first and second positions.

9. The detent mechanism of claim 8, wherein:
the detent means comprises a hollow cylindrical member which receives the detent portion of the main valve member and which is rotatable about an axis which is parallel to a direction of movement of the main valve member.

* * * * *